July 14, 1931. W. E. URSCHEL 1,814,983
FISH DEHEADER
Filed Nov. 25, 1925 4 Sheets-Sheet 1

Inventor
William E. Urschel
Attorney

July 14, 1931.  W. E. URSCHEL  1,814,983
FISH DEHEADER
Filed Nov. 25, 1925   4 Sheets-Sheet 3

Inventor
William E. Urschel
Attorney

July 14, 1931. W. E. URSCHEL 1,814,983
FISH DEHEADER
Filed Nov. 25, 1925 4 Sheets-Sheet 4
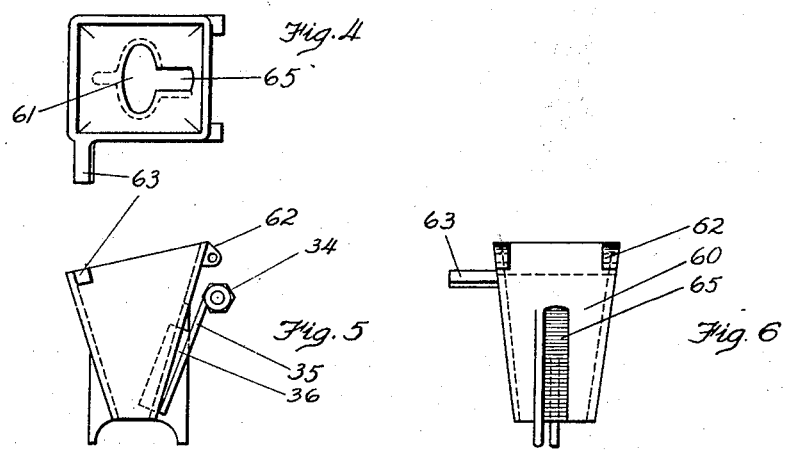
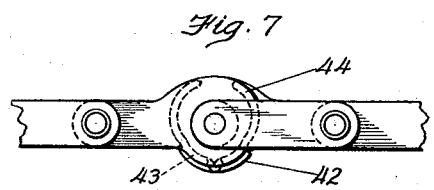
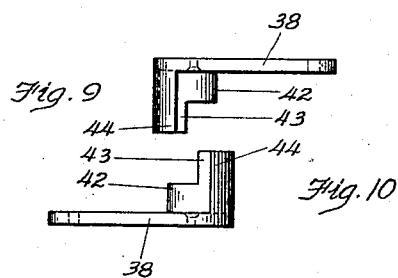
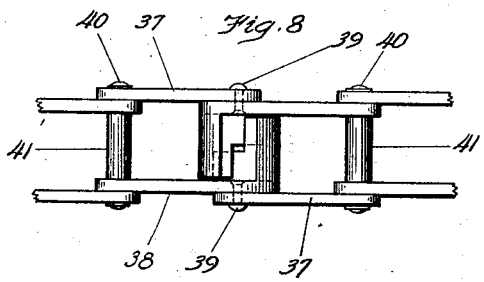
Inventor
William E. Urschel
Attorney Patented July 14, 1931

1,814,983

UNITED STATES PATENT OFFICE

WILLIAM E. URSCHEL, OF VALPARAISO, INDIANA

FISH DEHEADER

Application filed November 25, 1925. Serial No. 71,305.

The present invention relates to a device for separating the heads from the bodies or edible portions of fish. The mechanical features thereof, however, are adapted to a number of other utilitarian purposes, hence it is not the intention of applicant to be limited in the scope of his claims to a device adapted for use only in connection with the fish canning industry.

In the canning of fish, there are a number of operations. Among such operations is one which requires considerable accuracy, the deheading of the fish. Deheading is an incident preliminary to the preparing of practically all fish before preservation.

In practically all preserved fish products, the heads are entirely rejected, therefore, the present machine is adapted to supplying a much needed want in the industry, that of a machine having a large capacity adapted to be operated with low cost labor whereby a reduction in overhead is gained. In accomplishing these results, the efficiency of the deheading operation is in no way reduced over hand amputation, and greater uniformity is secured.

It must instantly be perceived that the ideal machine must be hopper fed. The machine must function by assorting the fish dumped into a hopper without any sense of order or arrangement and then feeding the fish, either head first or tail first, as is proper in the particular instance, against a knife or other deheading device.

Additionally, the ideal machine must be equipped with means for discharging the bodies of the deheaded fish into a delivery receptacle from which it may be removed for the performance of succeeding operations the head or rejected portion to be kept separated from the usable portion after passing the deheading part.

Fish used in canning or preserving generally run in schools. It may seem remarkable to one not experienced in the fishing industry that schools ordinarily comprise fish of precisely or substantially the same size. This running to size is the result of the peculiar custom of fish to propagate by laying a large number of eggs, all of which hatch at substantially the same time.

The mother fish of one school generally select a common hatching ground, hence the time of the depositing of the eggs in such hatching grounds is substantially simultaneous for the entire school. Naturally a school of fish derived from eggs deposited in this manner may comprise many millions of fish, all of substantially the same size because of the same age and subject to precisely the same conditions during growth.

Under these circumstances, schools are sought out by market fishermen. Means are provided whereby, when a school of fish is sighted, the commercial fisherman is enabled to capture a large portion thereof, if not substantially the entire school. The cannery fisherman is therefore able to deliver to the cannery a quantity of fish, all of about the same size.

When the consignment of fish is received at the cannery it is graded, and in the processes of cleaning the fish for preserving or canning, a proper sized deheader will be employed. It should be clear that a single machine cannot advantageously be designed to meet every size of fish which it is common and customary to can. Good management of a cannery, therefore, would suggest the grading of the fish as received and the use in the deheading thereof, of an apparatus particularly adapted for efficient use for each size. A well equipped cannery should possess, therefore, a number of deheading machines of the type here described in order to lend itself to all requirements.

With this brief description which will indicate the utility of a deheading machine and the circumstances attending its employment, a statement of the objects of the present invention will be made.

These objects include, among others, the provision of the following:—

In a device of the character here described, means for assorting objects in a manner whereby a predetermined portion of each is presented to a gripping or other member adapted to hold such objects for operations thereupon.

Novel holding means for a fish or similar object adapted to actuate only when fish are fed into it with a predetermined portion foremost.

Novel means for discharging from a hopper fish fed thereinto promiscuously, the discharge of fish therefrom being one at a time and with a predetermined portion foremost.

An unique holder or pocket for a fish in process of deheading, such holder or pocket being adapted to grip the fish at a particular portion of its body.

The combination of a hopper and a discharge means therefor adapted to remove fish therefrom head foremost;

A novel cutting means in conjunction with a hopper and a discharge member therefor whereby a hopper promiscuously loaded is adapted to release individual fish into said discharge member to be held thereby for the purpose of deheading and the separation of the severed parts.

The combination with a fish holding member of a deheading knife providing means for discharging the head in one direction and the body or useful portion in another.

An automatically operated machine into which fish may be fed promiscuously and from which such fish are discharged in an orderly arrangement, including a discharge apparatus having means for deheading the fish and separating the useful portions thereof from the portion to be rejected.

The provision in a hopper of means for arranging fish irregularly fed thereinto so that such fish will be removable therefrom head first only, the hopper including means for preventing fish from being discharged therefrom in any other manner than head first and means for freeing the discharge portions of the hopper from fish which can not be discharged head first.

These, and such other objects as may hereinafter appear, are obtained by the novel construction, combination, and arrangement of the several elements which constitute the invention, one embodiment thereof adapted to be used commercially for deheading fish being illustrated in the accompanying drawings, said drawings being made a part of this application.

Figure 1:
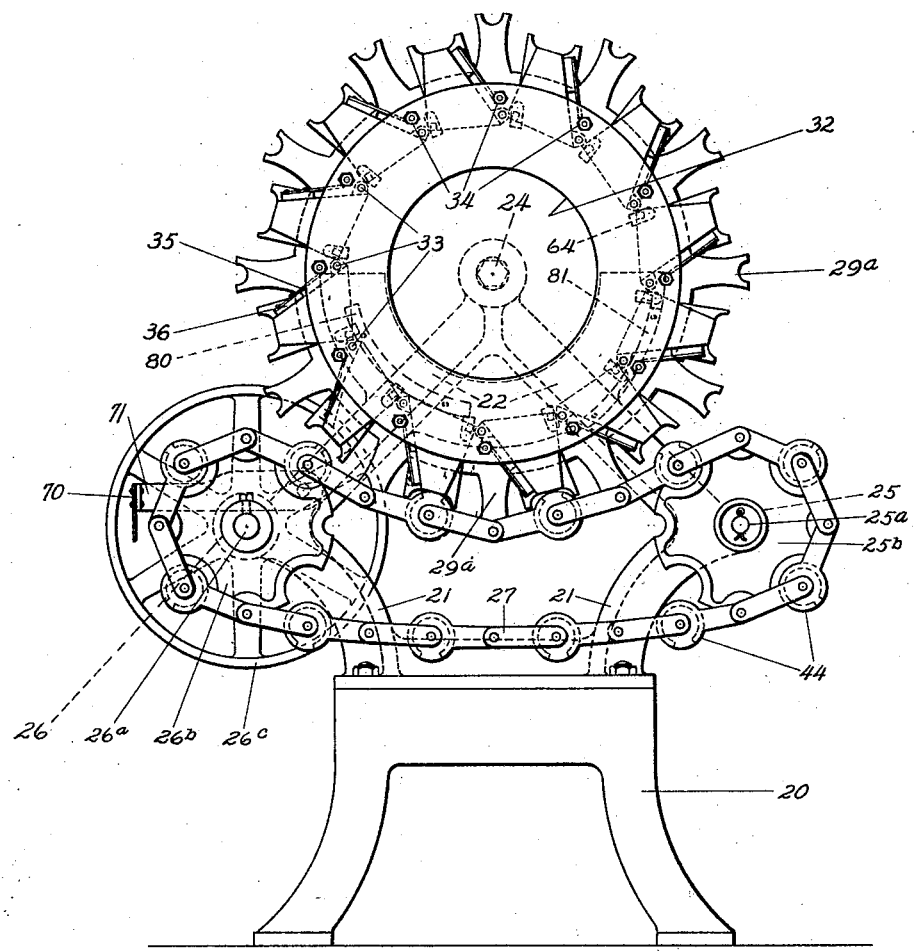
Figure 1 is a side elevation of a complete machine embodying the invention.

Figures 4, 5, and 6 are top, side, and end views of one of the pockets.

Figures 7 and 8 are enlarged side and top views of one form of chain employed upon the device.

Figures 9 and 10 are top views in detail of parts of the chain separated one from another.

Like reference characters are used to designate similar parts in the drawings and in the description which follows.

Figure 2:
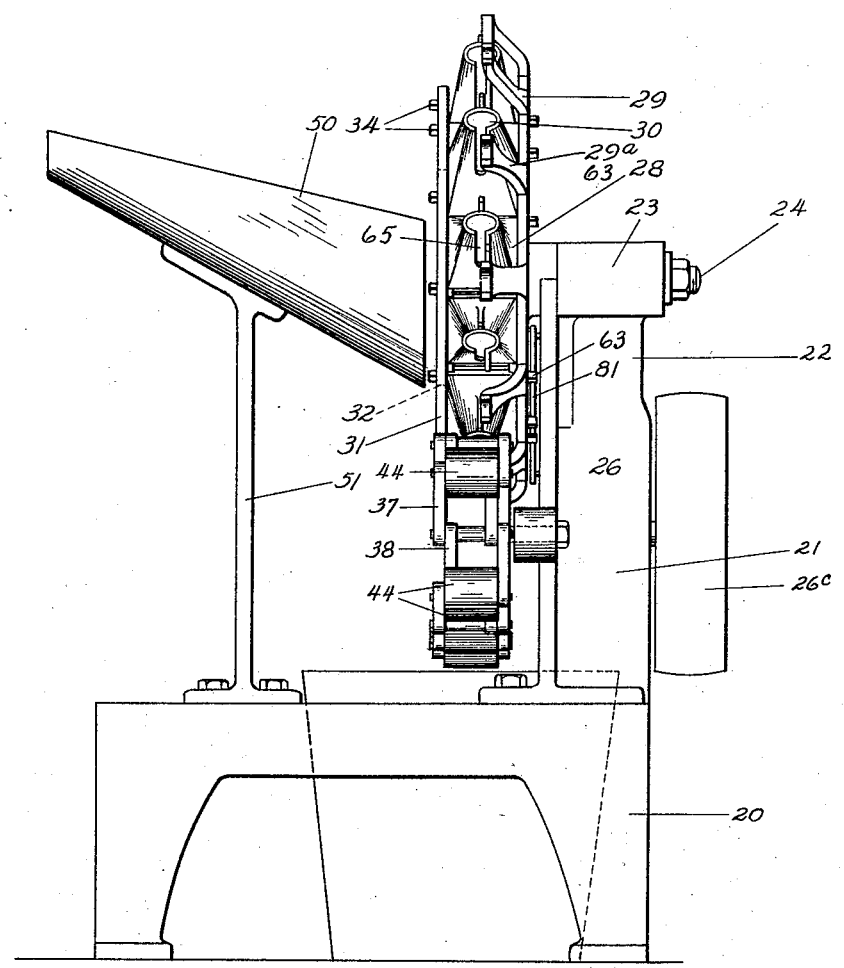
Figure 2 is an end elevation of the device shown in Figure 1.
Figure 3:
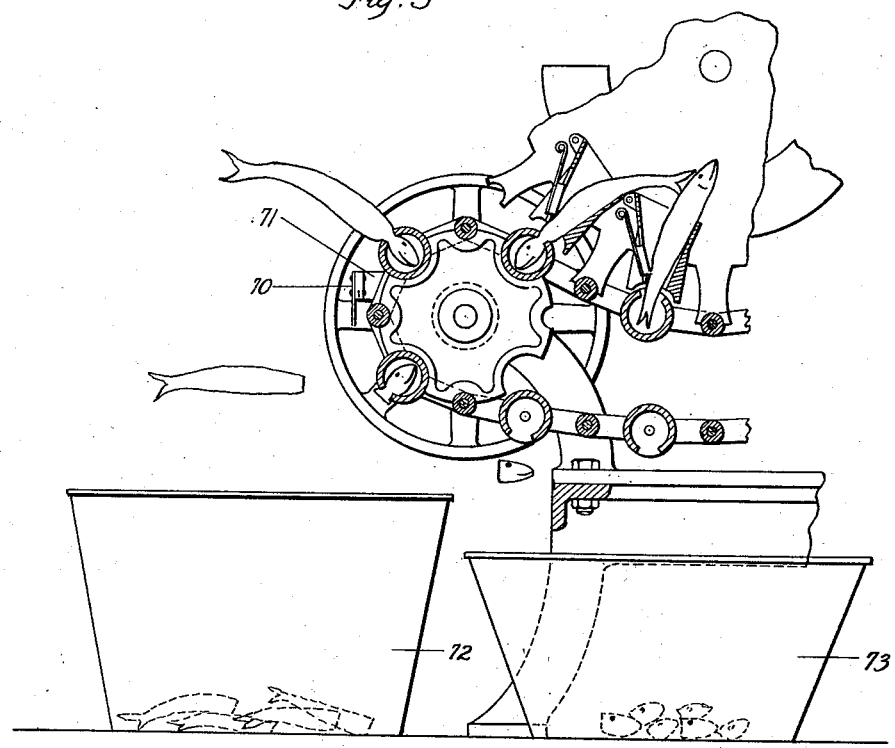
Figure 3 is a vertical section showing a portion of the hopper and its discharge pockets and the chain, various positions of fish therein being illustrated.

The apparatus in its entirety may be disposed upon a suitable base or stand 20 shown in Figures 1, 2, and 3. Secured to and extending upwardly from base 20 is a somewhat diamond shaped frame having lower and outwardly extending sections 21 and upper and inwardly directed sections 22.

Said upward and inwardly extending arms 22 intersect and at the intersection is a hub 23 from which projects a stud 24. At each of the intersections of each of arms 21 and 22 is a hub 25. Upon the right hand hub 25 is a stud shaft 25a upon which is a sprocket 25b. In the left hand hub 26 is journalled a shaft 26a upon which is disposed a sprocket 26b. Shaft 26a is secured to a pulley 26c which is connected to any suitable prime mover. Sprockets 25b and 26b are adapted to receive an endless chain 27, which is used to draw fish from a hopper now to be described, the details of said chain to be more completely discussed later.

Upon said stud 24 is a cylinder 28. Said cylinder 28 comprises a sprocket 29, pockets 30 shown in Figures 4, 5 and 6, and a plate 31. In said plate 31 is an aperture or opening 32. This is the opening into the cylinder 28.

Pockets 30 are hingedly disposed between the plate 31 and the sprocket 29. In mounting said pockets 30, it is usual to employ a rod 33 which extends through sprocket 29 and plate 31. Said rod 33 is an axis for partial revolution for pockets 30, and said pockets are adapted to oscillate upon said rods 33 for reasons which will hereinafter be made apparent.

Said plate 31 and said sprocket 29 are firmly held together by a plurality of bolts 34. Each of said pockets 30 has adjacent thereto a spring 35 and upon the end of said spring 35 is a block 36. Block 36 serves only as an enlargement for the end of 35 and is intended to move into and out of a lateral opening in pocket 30, the purpose of which will be later described. Said springs 35 are suitably secured to bolts 34 and are adjustably mounted thereon.

The cylinder 28 is adapted to rotate in a clockwise direction by chain 27, said chain engaging teeth or lugs 29a projecting outwardly from the sprocket 29 at predetermined and regular intervals. Pockets 30, it will be noted, register at their outlets or bottoms with the chain 27 at its larger joints while the smaller joints in said chain 27 engage said lugs 29a to impart rotating force to cylinder 28.

As just indicated the chain 27 comprises a plurality of links. For a proper understanding thereof reference should be had to Figures 7, 8, 9, and 10. The links of chain 27 are compound.

For description each link will be treated as comprising two sections. One section of each compound link comprises at one side a piece 37 which is a straight member having apertured ends. At the other side of such section is the member 38 which is shown in detail in Figure 10. The adjacent section of the link comprises a member 37 at the opposite side from the member 37 first mentioned, and a member 38 at the opposite side from the member 38 first mentioned, said members 38 having overlapping sections of material later to be described.

To join the members 37 and 38 at the joint where said sections 38 overlap, rivets 39 extending through members 37 and 38 are employed, leaving a pocket open at its top. At the other joint in the link, a transverse bolt 40 extends through the members 37 and 38 at each side and provides a support for a roller bearing 41 adapted to freely rotate on bolt 40 and engage the ends of members 37. As indicated in Figure 8, the roller bearing 41 and bolt 40 may be integral, and providing for the free relative movements of the bolt 40, and members 37 and 38.

In Figure 7, the overlapping portions of members 38 are illustrated. These comprise the part 42 which is exterior to the part 43 of the opposite member 38. Parts 42 and 43 form the under part of the larger joint which joint is adapted to be seated in the deeper depressions in sprockets 25b and 26b. The smaller joint rides in the shallow depressions in said sprockets.

Parts 44 of members 38 extend upwardly as shown in Figure 7 to provide jaws adapted to open and close with the flexing of the chain 27. It will be noted in Figures 1 and 3 that the jaws formed of parts 44 open when the arms of members 38 are moved toward the tips of parts 44, and that said jaws are closed when said arms are forced away from said parts.

If reference is had to Figure 1, it will be noted that the upper portion of the chain 27 is in such position intermediate the sprockets 25b and 26b that the jaws formed of parts 44 are open to receive the contents of pockets 30, the bottom opening in each of said pockets 30 being adapted to register with a jaw 44.

While moving about sprocket 26b (and 25b also), the links of chain 27 are articulated in the opposite direction, and the jaws 44 close, not entirely, but sufficiently to firmly grip the head of a fish extending thereinto, and to pull it from a pocket 30. Such a grip cannot be secured upon the tail of a fish for the body portion adjacent to the tail is of less thickness and there are no gills to aid the gripping and pulling action.

The fish may extend into the pocket in the chain between jaws 44 only to the bottom thereof, hence the chain 27 serves to determine or limit the portion of a fish which may be removed with the amputation of its head. Such an arrangement leads to uniformity and the deheaded portions are all of substantially the same characteristics, an advantage in conducting further operations thereupon.

Other forms of chain are of course possible and a chain having but one member in each section of the compound link has been successfully employed.

The cylinder 28 which is disposed upon a stud 24 upon the frame members 22 and 21 secured to the base 20 rotates, as shown in Figures 1 and 3, in a clockwise direction. As previously indicated, said cylinder 28 comprises a back plate 31 having an aperture 32 therethrough, and it is through this aperture that a chute 50 supported by the bracket 51 attached to the base 20 discharges.

The front of the cylinder 28 comprises a sprocket 29 having a plurality of projecting arms 29a which engage the chain 27 driving cylinder 28, said chain comprising a fish holding mechanism. The pockets 30 of the cylinder 28 are arranged adjacent to the periphery of the body of the sprocket 29 and of said rear plate 31.

Each of said pockets 30 is connected to the cylinder 28 by a bolt 33 which traverses the sprocket 29 and plate 31. In mounting said pockets 30, it is proper to dispose them approximately midway between the extending arms 29a upon the periphery of said sprocket 29.

Detail views of one of said pockets appear in Figures 4, 5 and 6. Each pocket 30 comprises a body portion 60 which tapers toward the bottom as is clearly shown in Figures 5 and 6. In each of said pockets 30 is a discharge orifice indicated by the numeral 61, which is at the bottom thereof, and which is somewhat of an exaggerated T configuration in cross section as shown in Figure 4. At one side of the pocket 30 are two ears 62 through which the bolt 33 passes.

The upper surface or top of the pocket 30 is generally oblique and at the side opposite the ears 62 a lug 63 is supplied which lug 63 is adapted to project through an aperture 64 in the sprocket 29, said sprocket having a plurality of said apertures 64 arranged in regular order thereon.

Upon the hinged side of each of the pockets 30 is a longitudinal opening indicated by the numeral 65. Said opening 65 accounts for the T-shaped appearance of the aperture in pocket 30 when said pocket is viewed from above, as in Figure 4, the portion 65 of the opening providing the stem of the T.

Into the opening 65, the block member 36 is adapted to ride, said block 36 member being on the spring 35 disposed intermediate the sprocket 29 and the plate 31. With movement of the pocket 30 in a clockwise direction about bolt 33, the opening 65 is closed by said block 36. Movement in a counterclockwise direction tends to free the openings 61 and 65.

When fish are dumped into the hopper 50, and the cylinder 28 is rotated, the fish in said cylinder 28 are agitated. Most of such fish will be deposited one at a time and head first into the pockets 30. When so deposited, the head portion of the fish projects through the bottom of the pocket 30 into the jaws 44 in the chain 27. As rotation of the cylinder 28 continues the jaws 44 are tightened in the manner heretofore described because the chain is bent about the pulley 26b, the jaws 44 gripping the fish firmly back of its gills and drawing it from the pocket 30.

Further rotation of sprocket 26b causes the fish to be forced against a stationary knife 70 at the end of a bracket 71 which may be suitably disposed upon the base or frame of the apparatus. The head and body of the fish are separated by a sort of shearing action, the body of the fish being amputated from the head and falling into a receptacle 72 provided to receive the bodies, the head being held in the jaws 44 until an almost complete movement of the fish about the left hand pulley 26b is had. When the chain 27 begins to travel in a straight line or in a truly horizontal direction, the jaws 44 are separated by the straightening out of the links 38 in the chain 27 and the fish head contained in the jaw portions 44 thereof is deposited in a receptacle 73 under the base 20 and provided for that purpose.

Fish which fall into the cylinder 28 in a horizontal position are sooner or later forced into the pockets 30 head first or tail first. What happens if forced thereinto head first has already been described.

When a fish falls into one of the pockets 30 tail first, which is the exception rather than the rule, because the fin and tail of the fish offer resistance to it falling into the pocket 30 tail first, the jaws 44 ordinarily will not grasp the fish with sufficient firmness to withdraw it from a pocket 30 but in order to be certain that the inverted fish is more securely held in the pocket 30 and that it will not be drawn therefrom by chain 27 when the tail is between the jaws 44, a cam 80 is provided.

Said cam 80 is an arcuate member disposed adjacent the sprocket 29 and its under surface engages the projection 63 upon each pocket 30 during the rotation of sprocket 29. As will be noted in Figure 1, the camming action of member 80 is to move the pocket 30 in a clockwise direction causing block 36 to move into orifice 65.

As the pockets 30 upon the cylinder 28 move upwardly from their lowermost point, the cam 80 engages the pocket 30 and continues in engagement therewith for about one-sixth turn of cylinder 28. The closing action of block 36 in orifice 65 is generally sufficient to cause said block 36 and pocket 30 to firmly hold the body of a fish within said block 36 because the grip of the jaws 44 upon the tail of the fish upon the closing of said jaws 44 thereon is insufficient to overcome the resistance which is thus offered against pulling the fish out of the pocket 30 tail first. The gripping action of pocket 30 and block 36, however, is a yielding one and prevents tearing of a fish to pieces.

When the fish drops into a pocket 30 head first, the grip of the jaws 44 is implanted back of the head of the fish and is enough to draw the fish past block 36 and out of pocket 30 against the pressure of cam 80 on pocket 30, and thereby withdraw the fish from the cylinder 28.

A pocket 30 is ordinarily relieved of a fish therein contained tail outermost when the pocket 30 reaches its uppermost position which is of course at the top of the cylinder 28. Under exceptional circumstances the fish remains in said pocket 30 and means for dislodging the fish therefrom must necessarily be provided. This is found in the cam 81 which engages the projection or lug 63 upon each pocket 30 to move it at its free side, such movement being away from the block 36 and in a counterclockwise direction. In this manner, the opening in the pocket is enlarged so that the fish therein will have better opportunity to be shaken therefrom by the movement or agitation of the cylinder 28 incident to its rotation.

Springs 35 prevent damage to the fish and injuries to the machine by applying only a yielding force to the fish and at no time forcing a clash between positively moving parts. To employ other than a yielding pressure upon fish would indeed be very destructive.

When a fish falls into a pocket 30 with its major transverse dimension at an angle of ninety degrees to the major transverse dimension of the opening 61 in said pocket 30, the fish will not drop far enough in such pocket that it projects from said pocket 30 sufficiently to be gripped by the jaws 44 in the chain 27, and when the cylinder 28 again approaches the topmost position, the fish therein contained will automatically drop out.

The oval opening 61 is arranged for the express purpose of preventing fish presenting themselves sideways, so to speak, from passing out of pocket 30. The oval openings 61 and the constricting walls of 30 guide the fish so that its gills lie close to the long curves of opening 61.

The operation of the machine is quite simple. Fish are fed into rotating cylinder 28 by chute 50. One by one, the fish are received into pockets 30 head first, and then as quickly drawn therefrom by chain 27 to be carried past knife 70 where the body is severed from the head, the head being deposited in a receptacle 72. The head is conveyed by chain 27, after such amputation, and deposited in a second receptacle 73.

Means are provided in the cylinder 28 for directing the fish head first into the pockets 30, and for preventing the removal of fish therefrom except by a grip had upon the heads.

I claim:

1. In a fish deheading machine, a rotatable vessel to loosely confine fish and having a discharge opening, discharge means adapted to release fish from said vessel head foremost, and severing means in the path of said fish to remove the heads thereof.

2. A fish deheading machine comprising a rotating cylinder adapted to loosely confine fish and having a plurality of pockets, a member adapted to grasp fish deposited in said pockets head foremost, and a knife adapted to engage fish when held in said member.

3. A fish deheading machine comprising a cylinder adapted to loosely confine fish and having a plurality of pockets, a member adapted to grip fish deposited in said pockets head first, a knife adapted to sever the head from fish held in said member, and means for preventing fish entering said pocket tail first or at an angle from being gripped by said member.

4. A fish deheading machine comprising a cylinder having a front, a back, and a plurality of pockets, and a member for withdrawing fish through said pockets comprising a chain having links, said links being adapted to register with said pockets and to grip fish contained in said pockets head foremost.

5. The machine described in claim 4, and in which means are provided for retarding the withdrawal of fish deposited tail foremost in said pockets.

6. The machine described in claim 4, and in which said pockets are provided with means for preventing the withdrawal of fish therethrough tail first, and said cylinder has means for facilitating the discharge from said pockets of fish improperly disposed for withdrawal therefrom.

7. A fish deheading machine comprising a cylinder having a front wall, a back wall, and a plurality of pockets movably mounted intermediate said walls and having a discharge opening, a member for withdrawing fish from said pockets, and means for enlarging and reducing the discharge opening in said pockets to facilitate the removal of fish contained in said pockets.

8. A fish deheading machine as described in claim 7, and in which said means for enlarging and reducing the discharge opening in said pockets comprises a fixed member, and instrumentalities are provided for moving said pockets toward and away from said fixed member.

9. A fish deheading machine is described in claim 7, in which said enlarging and reducing means comprises a fixed member upon said cylinder, and cams adjacent said cylinder, said pockets having lug members adapted to engage said cams.

10. In a fish deheading machine, a cylinder having a plurality of pockets, and a member for withdrawing fish head first from said pockets, said pockets being mounted in said cylinder to retard removal of fish therefrom tail first but not preventing the removal of fish head first therethrough.

11. In a fish deheading machine, a fish holding vessel comprising a sprocket and a plurality of pockets, and a member for withdrawing fish from said vessel comprising a chain having links adapted to grip fish contained in said pockets and to register with said sprocket.

12. In a fish deheading machine, a vessel for containing fish comprising a plurality of pockets and having an integral end and sprocket portion, and a mechanism for withdrawing fish from said pockets one at a time comprising a chain engaging said sprocket portion on said vessel.

13. The combination described in claim 12, and in which said chain is adapted to be actuated by a prime mover and to rotate said vessel.

14. In a fish deheading machine, a cylinder comprising a front wall, a back wall, and a plurality of pockets intermediate said walls, each of said pockets having a discharge opening and an orifice at the side of said opening, a fixed member adjacent said orifice, a spring for urging said pocket away from said fixed member, cams for urging said pocket toward and away from said fixed member, and a member for drawing fish from said pockets comprising a chain having links, said links being adapted to grip fish contained head first in said pockets and pull them from said pockets.

15. In a fish deheading machine, a cylinder mounted upon a horizontal axis and comprising a front wall, a back wall, and a plurality of pockets, said pockets being mounted at one side and for angular movement upon a transverse member intermediate said walls, cams for engaging said pockets at their free sides, a member for withdrawing fish from said pockets, said cams actuating said pockets to agitate the fish in said cylinder, and means for rotating said cylinder.

16. The device described in claim 15, and in which said member for withdrawing fish comprises a chain driven by a prime mover and driving said cylinder.

17. In a fish deheading machine, a vessel having an opening, and links adapted to register therewith, said links comprising fish gripping jaws.

18. The combination described in claim 17, and in which said links comprise inter-locking sections having extension portions adapted to form jaws.

19. The combination described in claim 17, and in which said links comprise bearing and extension portions, said extension portions being adapted to approach as an incident to angular movement between adjacent links.

20. A fish deheading machine comprising a fish receiving vessel having a plurality of pockets, means for agitating the fish contained in said cylinder, a chain of jaws for withdrawing fish from said cylinder and actuating said cylinder, and means for preventing fish contained in said pockets in a position other than head first from being withdrawn from said cylinder.

21. The fish deheading device described in claim 20, and in which said chain operates upon a sprocket disposed adjacent said vessel, and the movement of said chain about said sprocket actuates its jaws to grip and to release fish.

22. A fish deheading machine a vessel, a plurality of pockets therein, a member external to said vessel for gripping fish contained in said pockets, a knife, a discharging station for fish bodies, a discharging station for fish heads, and an instrumentality in association with said gripping member for holding said fish while the bodies are severed from the head by said knife and deposited at said body receiving station, said instrumentality releasing the heads of the fish at the discharging station for said heads.

23. A fish deheading machine comprising a vessel having an opening to discharge fish, and a member for withdrawing fish through said opening comprising a cup of predetermined depth having side portions adapted to grip a fish contained in said cup.

24. A fish deheading machine comprising a vessel to receive fish and having a pocket therein, said pocket comprising cooperating members yieldingly disposed relatively to one another, and a member for withdrawing fish from said vessel comprising clamping sections, said clamping sections being adapted to grip a fish at its head to withdraw said fish from said pocket, the withdrawal of a fish forcing a relative movement of said cooperating pocket members.

25. In a fish deheading machine a cylinder comprising a plurality of pockets having an opening, means for rotating said cylinder, an instrumentality in combination with each of said pockets for preventing fish from being withdrawn from said pockets tail first, said instrumentality retaining fish in said pockets until in a position to drop head first into an oppositely disposed pocket, and means to withdraw fish head first from said pockets.

26. A fish deheading machine a vessel to receive fish, a member for withdrawing fish from said cylinder head first, a knife associated with said withdrawing means, and a discharge station, said withdrawing means being adapted to cause said fish to be discharged into said station in a regular manner.

27. A fish deheading machine comprising rotary means for receiving loosely confined fish and arranging such fish singly and with their heads projecting foremost from said rotary means, means for gripping the projecting fish head, and means for severing such head from the body of the fish.

28. A fish deheading machine comprising rotary means for receiving loosely confined fish and arranging such fish singly with their heads foremost, means for gripping the head of each fish so arranged, means for severing such head from the body of the fish, receptacles for heads and bodies, and means for discharging the separated heads and bodies from said gripping means into the receptacles respectively provided therefor.

WILLIAM E. URSCHEL.